US008387878B2

(12) United States Patent
Chen et al.

(10) Patent No.: US 8,387,878 B2
(45) Date of Patent: Mar. 5, 2013

(54) IMAGER EXPOSURE, ILLUMINATION AND SATURATION CONTROLS IN A POINT-OF-TRANSACTION WORKSTATION

(75) Inventors: Caihua Chen, Hauppauge, NY (US); Carl Wittenberg, Water Mill, NY (US); Chinh Tan, Setauket, NY (US); Michael Steele, Wantagh, NY (US); Edmond L Fratianni, Port Jefferson Station, NY (US); Mark Drzymala, Commack, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 62 days.

(21) Appl. No.: 13/190,876

(22) Filed: Jul. 26, 2011

(65) Prior Publication Data
US 2013/0026233 A1 Jan. 31, 2013

(51) Int. Cl.
*G06K 7/00* (2006.01)
*G06K 5/00* (2006.01)
*G06K 7/10* (2006.01)
*G06K 7/14* (2006.01)
*G06K 15/12* (2006.01)
*G03B 7/08* (2006.01)
*G08C 21/00* (2006.01)

(52) U.S. Cl. ............. 235/440; 235/462.24; 235/462.41; 235/462.42; 235/454; 235/462.06

(58) Field of Classification Search .................. 235/440, 235/435, 462.23, 462.24, 462.06, 462.31, 235/462.39
See application file for complete search history.

(56) References Cited

U.S. PATENT DOCUMENTS

| | | | | |
|---|---|---|---|---|
| 5,280,162 A * | 1/1994 | Marwin | ..... | 235/462.31 |
| 6,244,510 B1 * | 6/2001 | Ring et al. | ..... | 235/462.43 |
| 7,639,142 B2 * | 12/2009 | Roeder et al. | ..... | 340/572.4 |
| 8,146,822 B2 * | 4/2012 | Drzymala et al. | ..... | 235/462.41 |
| 2001/0030237 A1 * | 10/2001 | Courtney et al. | ..... | 235/462.4 |
| 2001/0032884 A1 * | 10/2001 | Ring et al. | ..... | 235/454 |
| 2002/0121547 A1 * | 9/2002 | Wieth et al. | ..... | 235/383 |
| 2002/0139853 A1 * | 10/2002 | Tsikos et al. | ..... | 235/462.01 |
| 2003/0115096 A1 * | 6/2003 | Reynolds et al. | ..... | 705/14 |
| 2006/0032914 A1 * | 2/2006 | Brewster et al. | ..... | 235/383 |
| 2006/0032925 A1 * | 2/2006 | Acosta | ..... | 235/462.36 |
| 2006/0208083 A1 * | 9/2006 | Kotlarsky et al. | ..... | 235/462.01 |
| 2008/0029603 A1 * | 2/2008 | Harris | ..... | 235/462.31 |
| 2008/0078839 A1 * | 4/2008 | Barkan | ..... | 235/470 |
| 2008/0116281 A1 * | 5/2008 | Barkan | ..... | 235/472.01 |
| 2008/0215443 A1 * | 9/2008 | Dooley et al. | ..... | 705/14 |
| 2008/0230603 A1 * | 9/2008 | Stawar et al. | ..... | 235/383 |
| 2009/0020611 A1 * | 1/2009 | Sackett et al. | ..... | 235/462.08 |
| 2010/0252635 A1 * | 10/2010 | Drzymala et al. | ..... | 235/462.41 |
| 2012/0085824 A1 * | 4/2012 | Handshaw et al. | ..... | 235/462.31 |

* cited by examiner

*Primary Examiner* — Daniel Walsh
(74) *Attorney, Agent, or Firm* — Nong-Qiang Fan

(57) ABSTRACT

An illumination time of an illumination system and/or an exposure setting of an imaging system are adjusted by a proximity system operative for detecting a product entering a field of view in a bi-optical, dual window, point-of-transaction workstation. The proximity system includes an infrared emitter for emitting infrared light to the product, and an infrared sensor for sensing return infrared light from the product. Multiple predefined thresholds are stored for the sensed return infrared light, and a predefined illumination time and/or exposure setting are stored and assigned to each predefined threshold. Adjustment of the illumination time and/or of the exposure setting is performed by comparing the sensed return infrared light from the product in real time operation with the stored predefined thresholds.

18 Claims, 16 Drawing Sheets

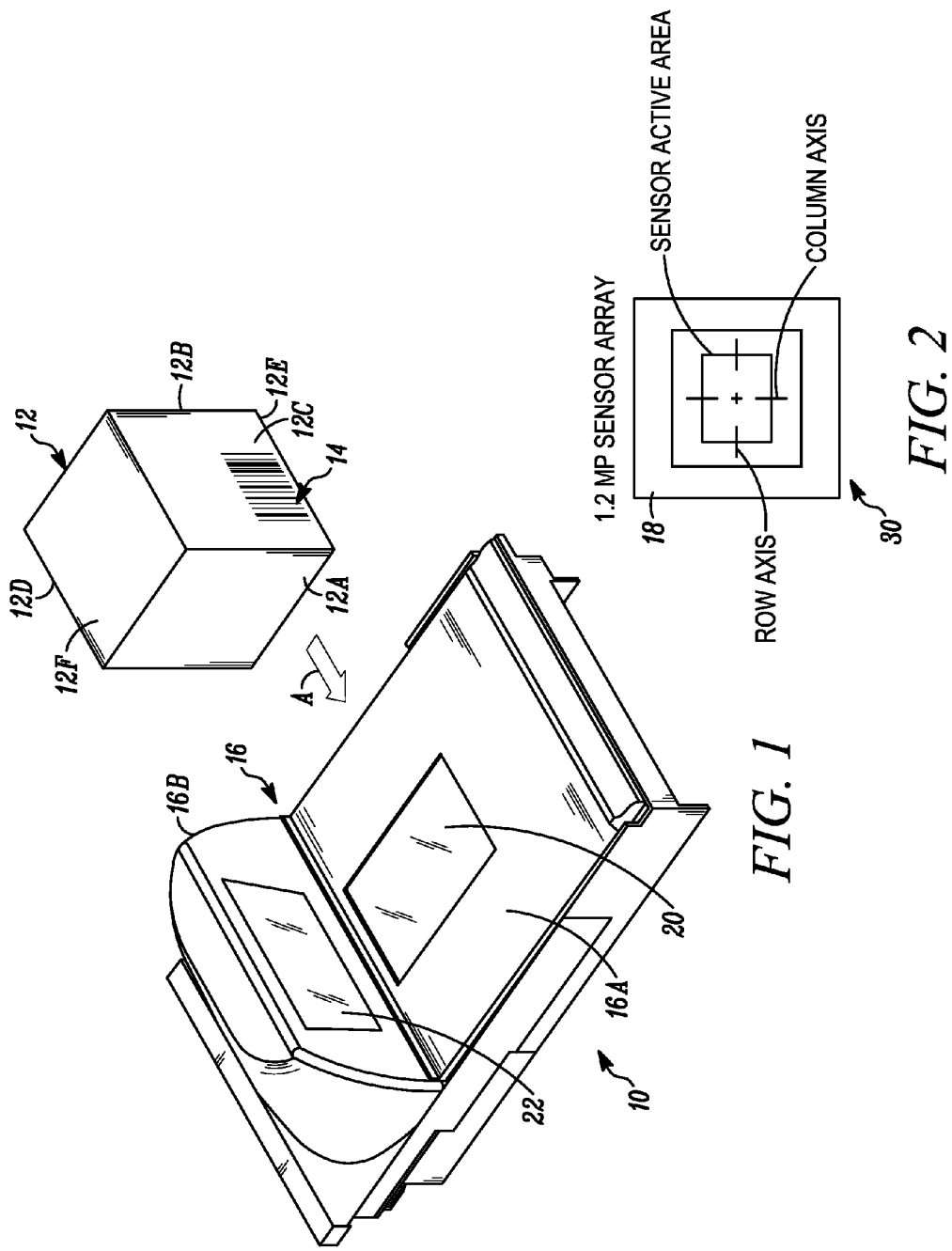

IMAGER EXPOSURE, ILLUMINATION AND SATURATION CONTROLS IN A POINT-OF-TRANSACTION WORKSTATION

BACKGROUND OF THE INVENTION

It is known to use laser-based and/or imager-based readers or scanners in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved in various directions by a user across, or presented to a central region of, a generally horizontal window that faces upwardly above the countertop and/or a generally vertical or upright window that rises above the countertop. When at least one laser scan line generated by a laser-based reader sweeps over a symbol and/or when return light from a symbol is captured over a field of view by a solid-state imager of an imager-based reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be moved relative to the windows in various directions, for example, from right-to-left, or left-to-right, and/or in-and-out, or out-and-in, and/or high-to low, or low-to-high, or any combination of such directions, or may be positioned either in contact with, or held at a working distance away from, either window during such movement or presentation. All these factors make the symbol location variable and difficult to predict in advance.

As advantageous as workstations with laser-based readers have been in processing transactions, workstations with imager-based readers, also known as imagers or cameras, are thought to offer improved reliability and have the added capability of reading indicia other than UPC symbols, such as two-dimensional or stacked or truncated symbols, as well as the capability of imaging non-symbol targets, such as receipts, driver's licenses, signatures, etc. It was initially thought that an all imager-based workstation would require about ten to twelve, or at least six, imagers in order to provide a full coverage scan zone to enable reliable reading of indicia that could be positioned anywhere on all six sides of a three-dimensional product. However, to bring the cost of the imager-based workstation down to an acceptable level, it is known to reduce the need for the aforementioned six to twelve imagers down to two imagers, or even one imager, by splitting the field of view of at least one imager into a plurality of subfields of view, each additional subfield serving to replace an additional imager. The scan zone extends above the horizontal window and in front of the upright window as close as possible to the countertop, and sufficiently high above the countertop, and as wide as possible across the width of the countertop. The scan zone projects into space away from the windows and grows in volume rapidly in order to cover indicia on products that are positioned not only on the windows, but also many inches therefrom.

Each imager includes an array of image sensors, and typically has an associated illumination assembly to illuminate the indicia with illumination light. The image sensors detect the return illumination light reflected and/or scattered from the indicia. Each imager preferably operates at a frame rate of multiple frames per second, e.g., sixty frames per second, each frame lasting about 16.67 milliseconds. Each subfield of view, also known as a light collection region, is preferably individually illuminated and extends through at least one window over regions of the product. Each imager includes either a global or a rolling shutter to help prevent image blur, especially when the indicia passes through the scan zone at high speed, e.g., on the order of 100 inches per second. Preferably, to reduce power consumption, to prolong operational lifetime, and to reduce bright light annoyance to operators and customers, the illumination light is not emitted at all times, but is emitted only when a proximity sensor detects the presence of a product entering the workstation. Upon product detection, the proximity sensor causes the illumination assembly to be activated.

To insure good reading performance, each imager must be properly exposed, and such aforementioned variable factors as the working distance, orientation, direction, speed and position of the indicia, as well as the light transmissivity of each window, must be taken into account. To achieve such proper exposure, it is known to provide an imager with an internal auto-exposure circuit for measuring the intensity level of the return illumination light in the field of view of the imager, and for adjusting the exposure duration of the imager. As advantageous as such an internal auto-exposure circuit is, it adjusts the exposure duration of the imager in which it is internally integrated, typically only after a few frames have elapsed. This non-negligible time delay creates a sluggishly performing workstation and may, in some cases, even be perceived as defective.

SUMMARY OF THE INVENTION

This invention relates to a point-of-transaction workstation for electro-optically imaging indicia associated with multi-sided products. The indicia are preferably, but not necessarily, bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window. The products may be generally moved relative to the windows in various directions, for example, from right-to-left, or left-to-right, and/or in-and-out, or out-and-in, and/or high-to low, or low-to-high, or any combination of such directions, or may be positioned either in contact with, or held at a working distance away from, either window during such movement or presentation.

An imaging system, which includes at least one solid-state imager, and preferably two solid-state imagers, one for, and associated with, each window, is supported by the housing. Preferably, both imagers are commonly mounted on a printed circuit board. Each imager has a sensor array of image sensors (also known as pixels) looking at a field of view. Each imager preferably comprises a two-dimensional, charge coupled device (CCD) array, or a complementary metal oxide semiconductor (CMOS) array, of image sensors of megapixel size, e.g., 1280 pixels wide×960 pixels high. The array of image sensors is arranged along mutually perpendicular array axes, i.e., a row axis and a column axis. Each imager includes an imaging lens assembly for capturing return light from the indicia and for projecting the captured return light onto the sensor array. Each imager has an electronic shutter, typically a global shutter, that exposes the imager for an adjustable exposure time or setting, for example, a value starting above zero to a maximum exposure time, e.g., a value between 400-750 microseconds. Each imager preferably operates at a frame rate of multiple frames per second, e.g., sixty frames per second, each frame therefore lasting about 16.67 milliseconds.

An optical system is preferably supported by the housing and is operative for splitting the field of view of at least one of the imagers into a plurality of subfields of view that extend through at least one of the windows over regions of the product. Preferably, the optical system includes a first optical splitter for splitting the field of view of one of the imagers into three subfields of view that pass through one of the windows, and a second optical splitter for splitting the other field of view of the other imager into another three subfields of view that pass through the other of the windows. As discussed above, the use of optical splitters reduces the number of imagers in the workstation. Thus, only two imagers are preferably needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

An illumination system, preferably including a plurality of energizable illuminators, one for each subfield of view, is operative for illuminating each subfield of view with illumination light over an adjustable illumination time, preferably in a range of about 0.25 to about 0.75 milliseconds. Each illuminator preferably includes multiple illumination light sources, e.g., light emitting diodes (LEDs). The imaging lens assembly is operative for capturing the illumination light returned from the indicia in each subfield of view along respective optical paths from each window to each imager.

At least one proximity system, and preferably a plurality of proximity systems, is located externally of the imagers, and is operative for detecting a product in a respective field of view. Each proximity system advantageously includes an infrared emitter for emitting infrared light to the product, and an infrared sensor for sensing return infrared light from the product. In response to such detection of the product, a controller or programmed microprocessor, which is operatively connected to the imaging system, the illumination system, and each proximity system, is operative, in accordance with one feature of this invention, for adjusting the illumination time of the illumination system and/or the exposure of each imager. The controller is also operative for processing the captured illumination light in at least one of the subfields of view to read the indicia, and to decode the indicia if the indicia is a symbol.

In a preferred embodiment, a first proximity system is mounted on a first printed circuit board at one side of the housing and detects the product entering the field of view in a first direction, and a second proximity system is mounted on a second printed circuit board at an opposite side of the housing and detects the product entering the field of view in a second direction that intersects the first direction. Both first and second proximity systems emit and sense light through the at least one window, e.g., the horizontal window, and can thus detect whether the product is entering the workstation from the right side or from the left side of the workstation. A third proximity system is mounted on a third printed circuit board and is operative for detecting entry of the product in a third direction by emitting and sensing light through the other window, e.g., the upright window, and can thus detect whether the product is forwardly or rearwardly entering the workstation.

Thus, the intensity level of the return infrared light in each of these directions is sensed by its own individually dedicated proximity system. The illumination time of each illuminator in each illuminated subfield of view and/or the exposure of each imager are either separately or jointly adjusted. The proximity system has heretofore only been used for product detection and for activating the illumination system. According to this invention, the proximity system is used for additional purposes, i.e., to adjust the illumination time and/or the imager exposure. No longer need such workstations rely on internal auto-exposure circuits that adjust the exposure of the imager after a few frames have elapsed. No longer need such workstations be characterized as sluggish or defective. Processing performance is enhanced, all without adding additional complexity and undue expense to the workstation.

It is further advantageous to store a plurality of predefined intensity level thresholds for the sensed return infrared light in the controller, and to have the controller adjust the illumination time and/or the exposure by comparing the sensed return infrared light from the product in real time operation with these predefined thresholds. Thus, the threshold for reading indicia in a near range of working distances close to a respective window will be set to a shorter illumination time as compared to reading indicia in a far range of working distances remote from the respective window; otherwise, the sensed return illumination light will be too bright and will blind or saturate the imager. An illumination time and/or exposure suitable for reading indicia in a near range of working distances will not be suitable for reading indicia in a far range of working distances, and vice versa. This invention therefore also proposes to store a predefined illumination time and/or exposure that are associated with, and assigned to, each stored predefined threshold in the controller. Upon determination of the level of the sensed return infrared light from the product in real time operation, the assigned predefined stored illumination time and/or exposure are used, thereby increasing the responsiveness of the workstation and/ or decreasing any performance dead areas in the scan zone arising from too much, or too little, intensity of the return illumination light.

Yet another feature of this invention resides in a method of processing products by electro-optically imaging indicia associated with the products. The method is performed by supporting at least one window and at least one solid-state imager having an adjustable exposure and an array of image sensors looking at a field of view that extends through the at least one window to the indicia to be imaged on a housing, illuminating the field of view with illumination light from an illumination system over an adjustable illumination time, capturing return illumination light from the indicia, detecting a product in the field of view with at least one proximity system located externally of the at least one imager, adjusting the illumination time of the illumination system and/or the exposure of the at least one imager in response to detection of the product by the at least one proximity system, and processing the captured illumination light in the field of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a dual window, bi-optical, point-of-transaction workstation or imaging reader operative for reading indicia on a multi-sided product passing through the workstation by image capture;

FIG. 2 is a top plan view of a sensor array of an imager for use in the workstation of FIG. 1;

DETAILED DESCRIPTION OF THE PREFERRED EMBODIMENTS

Figure 3:
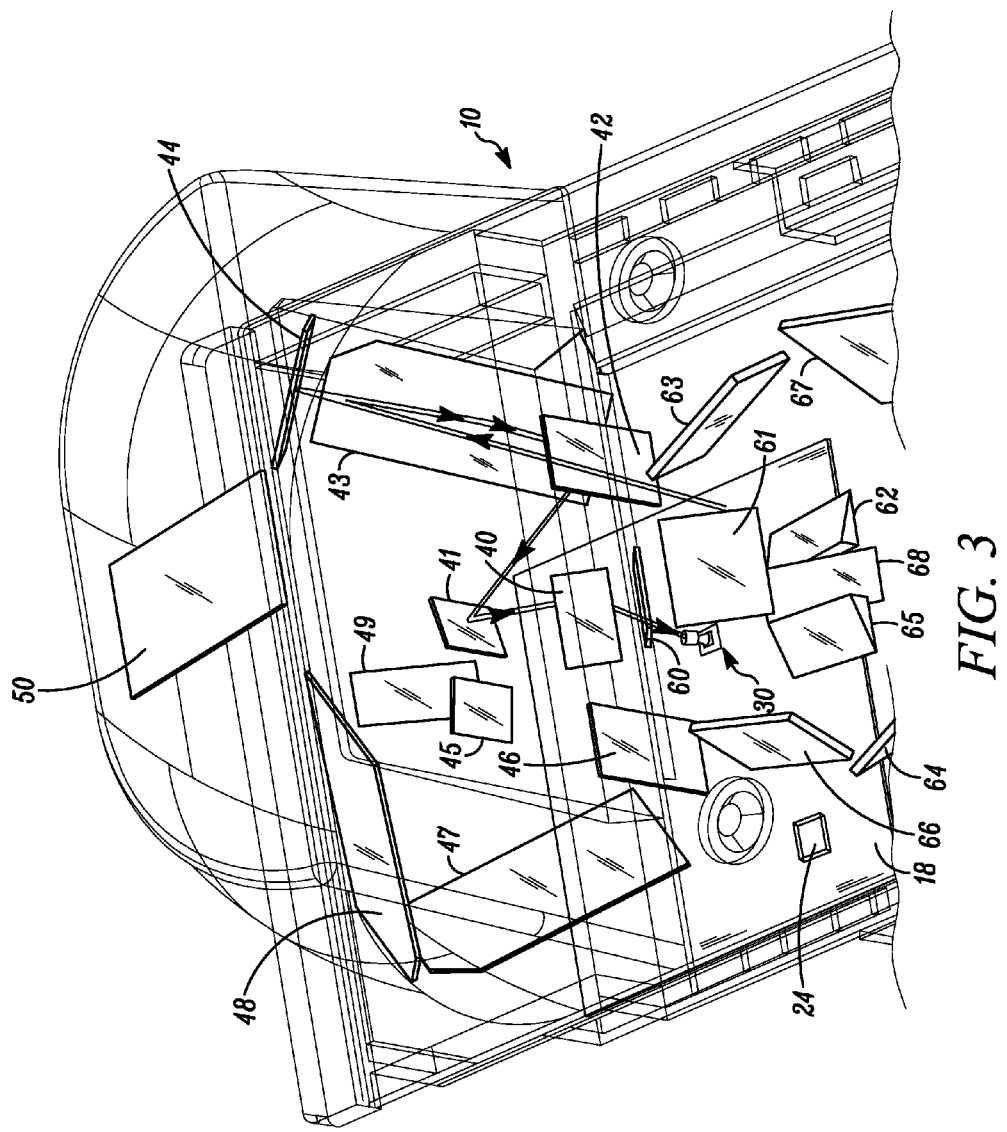
FIG. 3 is a broken-away, enlarged, perspective view of part of an optical system in the workstation of FIG. 1 diagrammatically depicting a folded optical path of an outer subfield of view of the imager of FIG. 2 for exit through an upright window.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 measures about four inches in width by about six inches in length, while the generally upright window 22 measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved through the scan zone by an operator or a customer across and past the windows 20, 22 in various directions, for example, from right-to-left in FIG. 1 in the direction of the arrow A, or from left-to-right in FIG. 1 in a direction opposite to the direction of the arrow A, or from front-to-back in a direction generally perpendicular to and towards the upright window 22, or from back-to-front in a direction generally perpendicular to and away from the upright window 22, or from above toward or away from either window, or from below toward or away from either window, or in a combination of these directions, or is presented to a central region of either window. As described above, the product 12 can be tilted or moved in other directions through the workstation 10.

Figure 4:
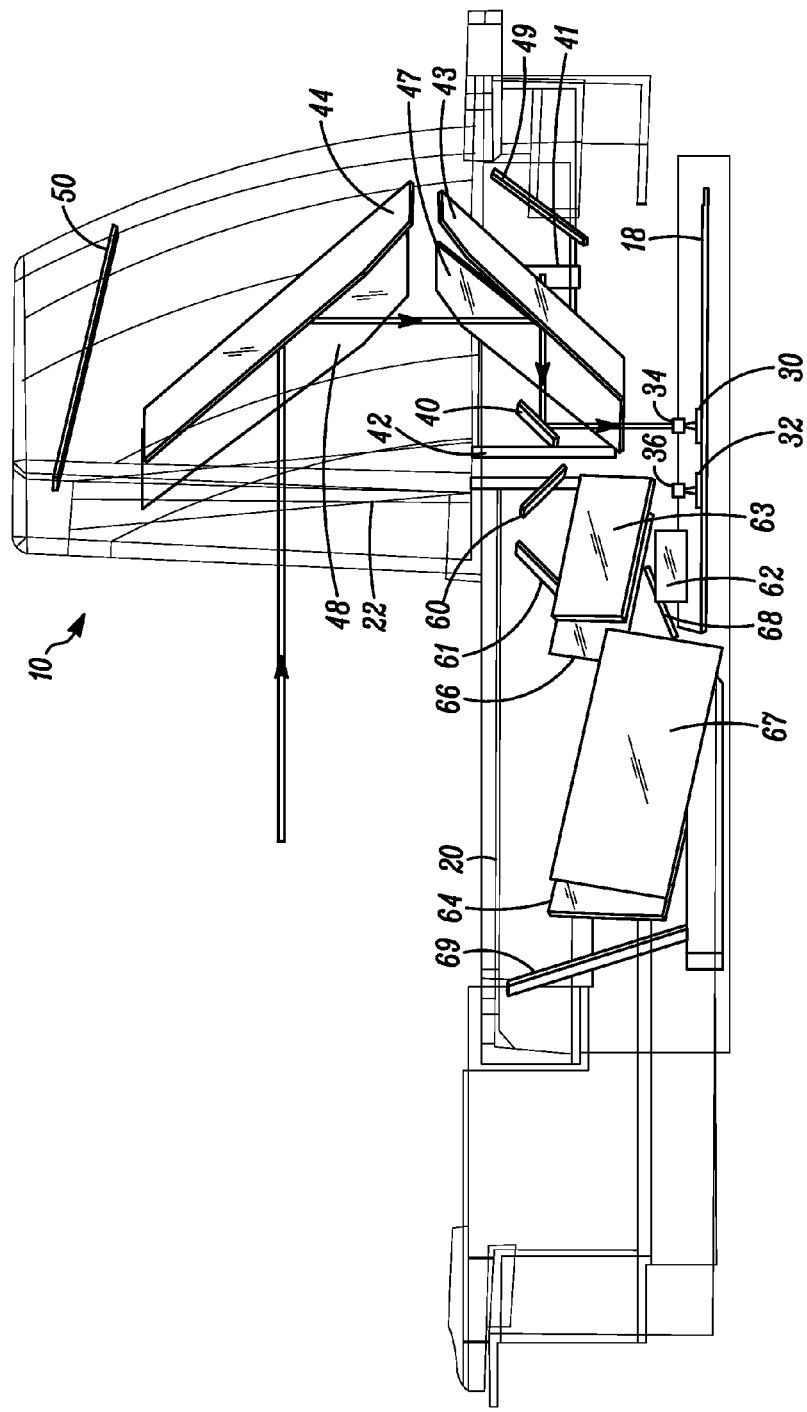
FIG. 4 is a side perspective, enlarged, view of the optical path of FIG. 3.
Figure 14:
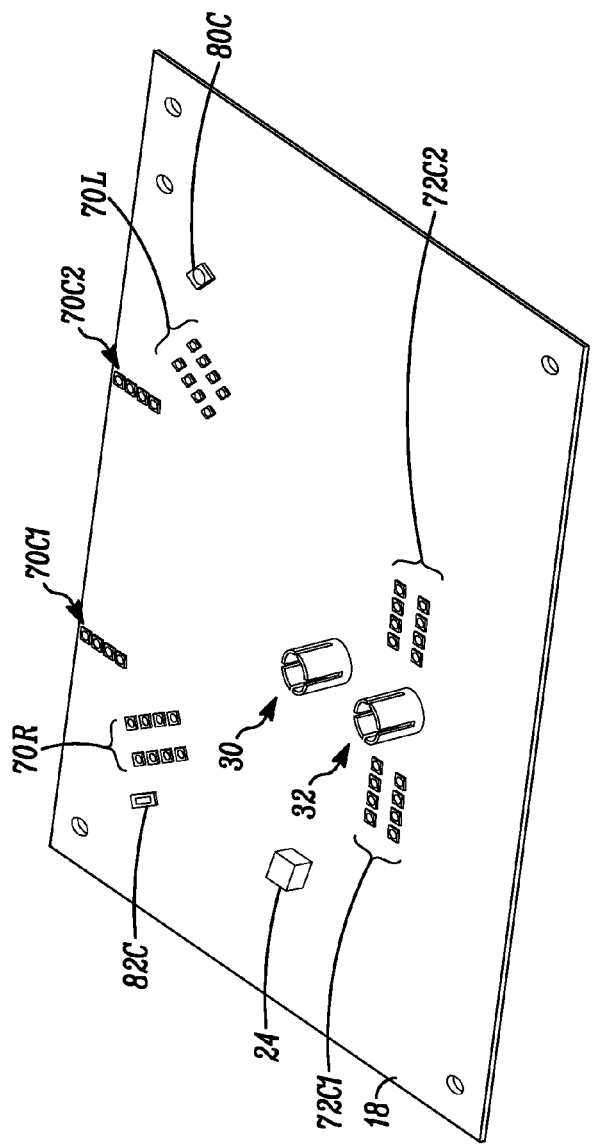
FIG. 14 is a perspective view of a proximity system commonly mounted with other system components on a main printed circuit board within the workstation of FIG. 1 for detecting a product through the upright window of the workstation in accordance with this invention.

As best shown in FIGS. 3-4, a first solid-state imager 30 and a second solid-state imager 32 are commonly supported on a printed circuit board 18 within the housing (see also FIG. 14). Each imager 30, 32 has a sensor array of image sensors looking at a field of view diagrammatically shown by speckles in the various views. As described below, the field of view of the first imager 30 is directed out of the upright window 22; hence, the first imager 30 will be individually referred to as the vertical imager 30 for convenience. Similarly, the field of view of the second imager 32 is directed out of the horizontal window 20; hence, the second imager 32 will be individually referred to as the horizontal imager 32 for convenience.

Each imager 30, 32 preferably comprises a two-dimensional, charge coupled device (CCD) array, or a complementary metal oxide semiconductor (CMOS) array, of image sensors of megapixel size, e.g., 1280 pixels wide×960 pixels high. In a preferred embodiment, the field of view of each imager 30, 32 measures about 15 degrees by 30 degrees. The arrays of both imagers 30, 32 extend along mutually perpendicular, row and column, directions. Thus, as shown in FIG. 2, each imager has a row axis and a column axis. Each imager 30, 32 includes an imaging lens assembly 34, 36 (see FIG. 4) for capturing return light from the indicia and for projecting the captured return light onto the respective sensor array.

Each imager 30, 32 preferably has a shutter, typically a global shutter, that exposes each imager for an adjustable exposure time or setting, for example, a value starting above zero to a maximum exposure time, e.g., a value between 400-750 microseconds, that is needed to capture indicia at the maximum working distance away from each window. Each imager preferably operates at a frame rate of multiple frames per second, e.g., sixty frames per second, each frame therefore lasting about 16.67 milliseconds. The shutter insures that the captured images will not be disturbed by motion of the indicia 14 relative to the window(s) during the exposure time. A rolling or a mechanical shutter could also be employed. The indicia 14 can be presented or swiped at speeds up to around 100 inches per second across any part of either window.

Figure 13:
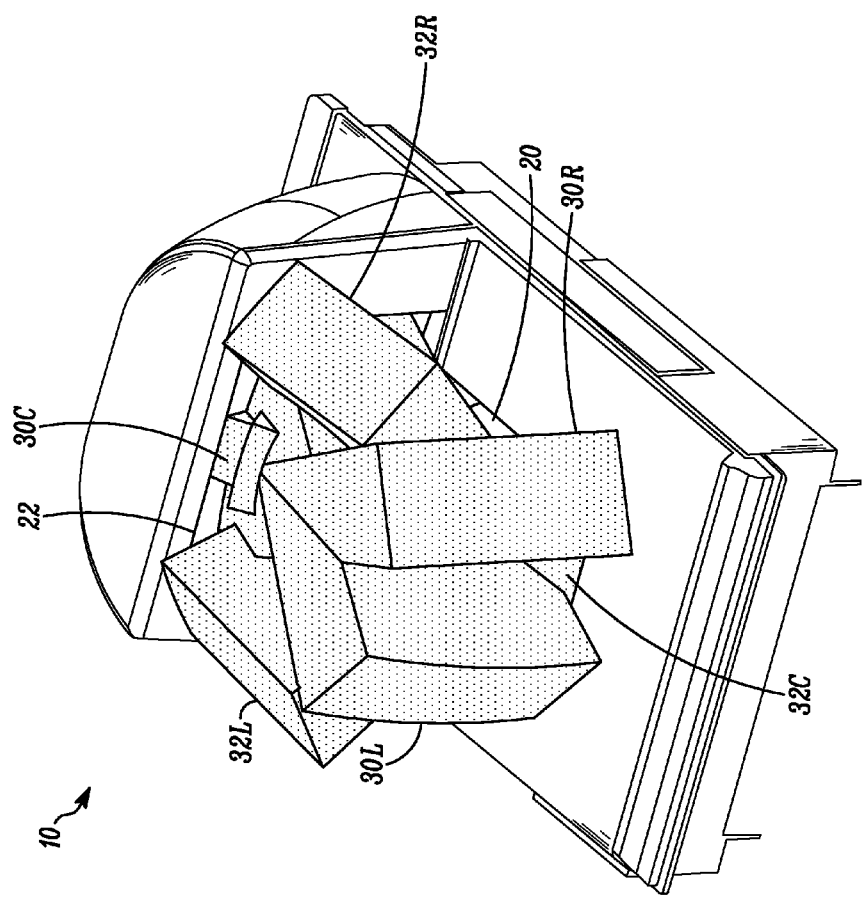
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imager 30, and along a second folded optical path from the horizontal window 20 to the horizontal imager 32. As described in more detail below, the optical system is further operative for splitting the field of view of the vertical imager 30 into a plurality of subfields of view, namely a center subfield 30C flanked by two outer, right and left, subfields 30R, 30L, and for splitting the field of view of the horizontal imager 32 into a plurality of subfields of view, again a center subfield 32C flanked by two outer, right and left, subfields 32R, 32L. These various subfields outside of the windows 20, 22 are shown in FIG. 13.

The optical system has a plurality of fold minors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imager 30 and the upright window 22 to fold the captured return light in the outer subfield 30L to successively reflect off minors 44, 43, 42, 41 and 40, in that order, prior to being focused by the imaging lens assembly 34 onto the vertical imager 30. In analogous manner, a second plurality of fold mirrors 40, 45, 46, 47 and 48 are positioned along a second optical path part between the vertical imager 30 and the upright window 22 to fold the captured return light in the outer subfield 30R to successively reflect off minors 48, 47, 46, 45 and 40, in that order, prior to being focused by the imaging lens assembly 34 onto the vertical imager 30. A third plurality of fold mirrors 40, 49 and 50 are positioned along a third optical path part between the vertical imager 30 and the upright window 22 to fold the captured return light in the center subfield 30C to successively reflect off mirrors 50, 49 and 40, in that order, prior to being focused by the imaging lens assembly 34 onto the vertical imager 30.

Figure 5:
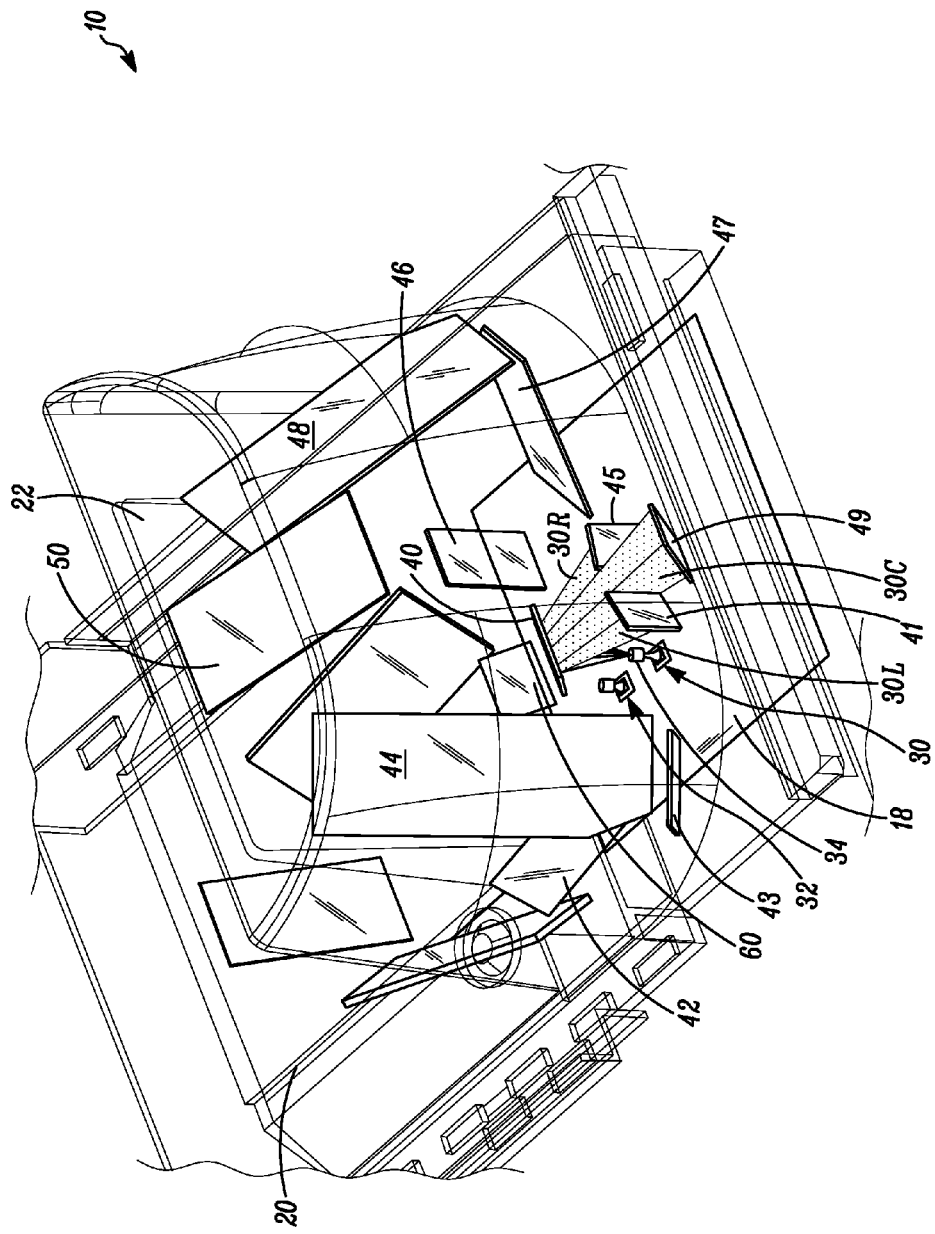
FIG. 5 is a rear perspective view of the optical system part of FIG. 3 depicting an optical splitter for splitting the field of view of the imager into a central subfield of view flanked by two outer subfields of view.
Figure 6:
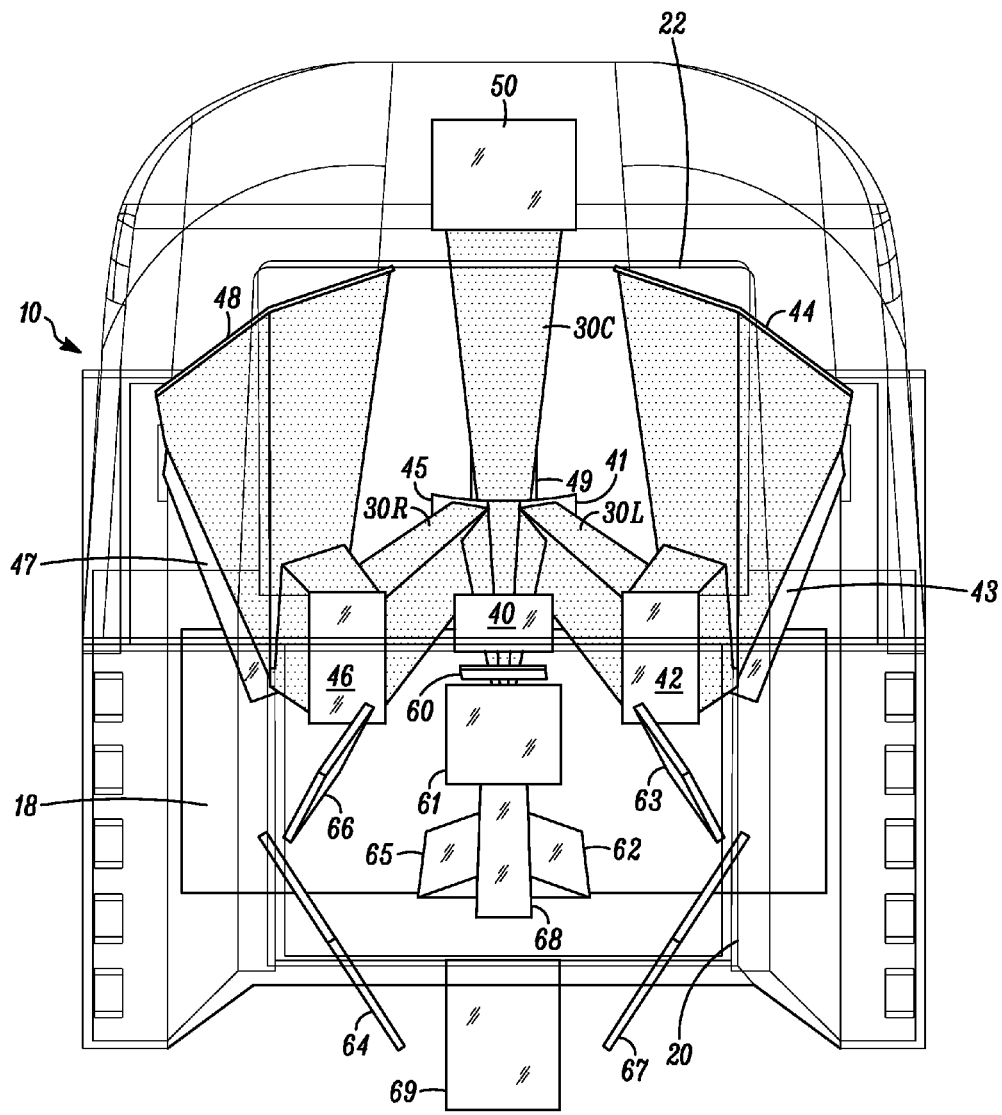
FIG. 6 is a top plan view of the optical system part of FIG. 3 diagrammatically depicting the subfields downstream of the optical splitter.
Figure 7:
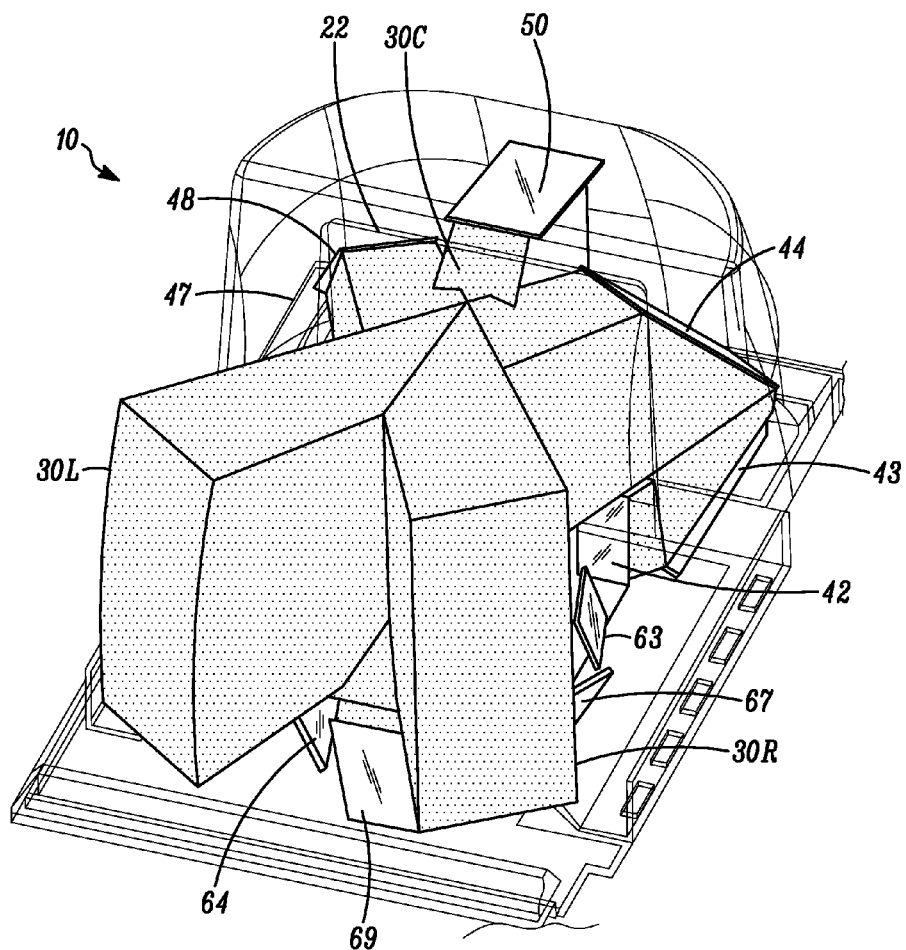
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the minor 49 splits a central part of the field of view of the vertical imager 30 into the center subfield 30C, wherein the minor 41 splits an outer part of the field of view of the vertical imager 30 into the outer subfield 30L, and wherein the minor 45 splits another outer part of the field of view of the vertical imager 30 into the outer subfield 30R. FIG. 6 best depicts, as seen from above, the separate passage and folding of the outer subfield 30L between the minors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the minor 44, and the separate passage and folding of the outer subfield 30R through the upright window 22 and onto the minor 48.

The above discussion for FIGS. 3-7 dealt with the various fold mirrors of the optical system for folding and splitting the subfields 30C, 30L and 30R between the upright window 22 and the vertical imager 30. The following discussion of FIGS. 8-12 deals with additional fold minors of the optical system for folding and splitting additional subfields 32C, 32L and 32R between the horizontal window 20 and the horizontal imager 32.

Figure 8:
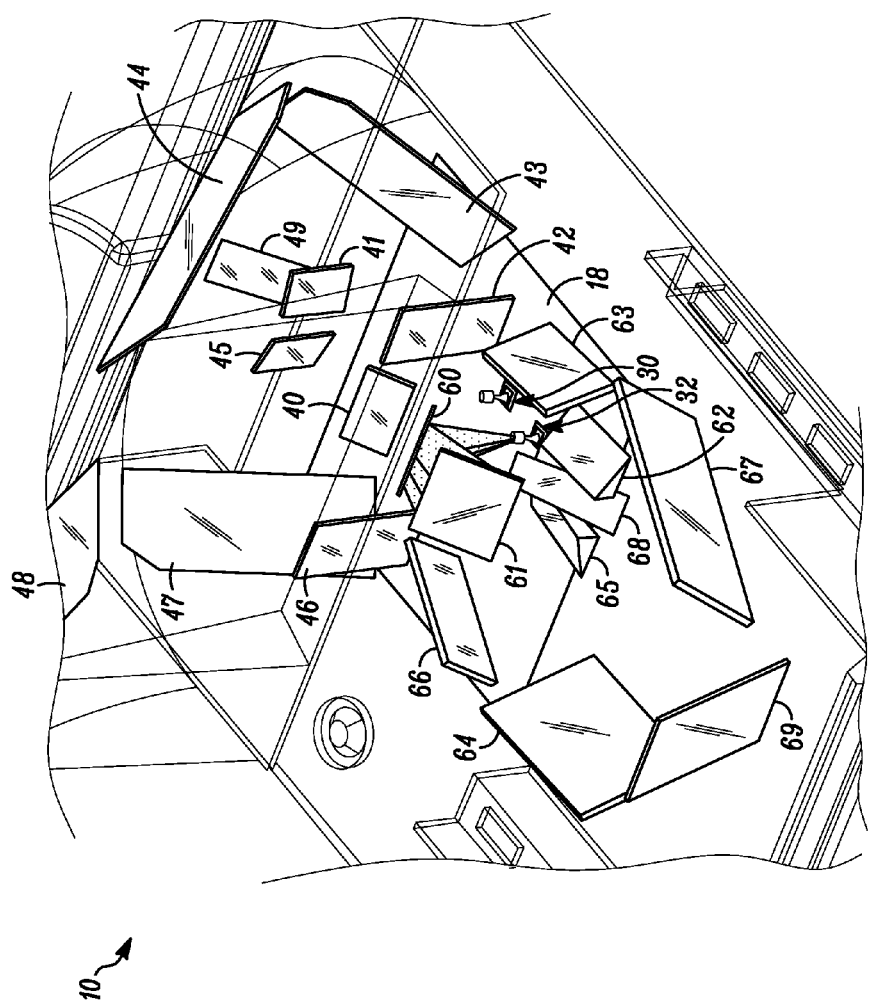
FIG. 8 is a broken-away, enlarged, perspective view of another part of the optical system in the workstation of FIG. 1 diagrammatically depicting part of another folded optical path of the field of view of another imager prior to reaching another optical splitter.
Figure 9:
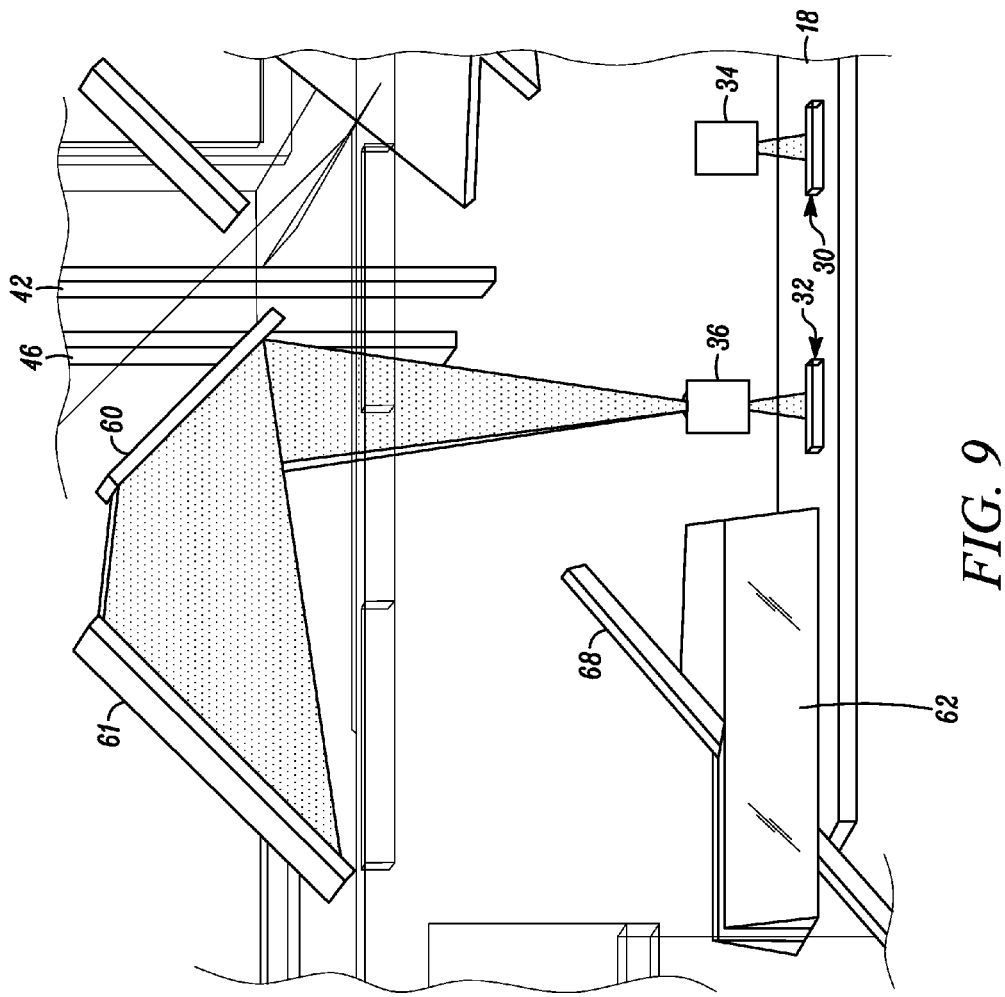
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imager 32 and the horizontal window 20 to fold the captured return light in the outer subfield 32R to successively reflect off minors 64, 63, 62, 61 and 60, in that order, prior to being focused by the imaging lens assembly 36 onto the horizontal imager 32. In analogous manner, a fifth plurality of fold mirrors 60, 61, 65, 66 and 67 are positioned along a second optical path part between the horizontal imager 32 and the horizontal window 20 to fold the captured return light in the outer subfield 32L to successively reflect off minors 67, 66, 65, 61 and 60, in that order, prior to being focused by the imaging lens assembly 36 onto the horizontal imager 32. A sixth plurality of fold minors 60, 61, 68 and 69 are positioned along a third optical path part between the horizontal imager 32 and the horizontal window 20 to fold the captured return light in the center subfield 32C to successively reflect off minors 69, 68, 61 and 60, in that order, prior to being focused by the imaging lens assembly 36 onto the horizontal imager 32.

The aforementioned mirrors 62, 65 and 68, as best seen in FIG. 8, comprise a second optical splitter, wherein the minor 68 splits a central part of the field of view of the horizontal imager 32 into the center subfield 32C, wherein the mirror 62 splits an outer part of the field of view of the horizontal imager 32 into the outer subfield 32R, and wherein the minor 65 splits another outer part of the field of view of the horizontal imager 32 into the outer subfield 32L.

Figure 10:
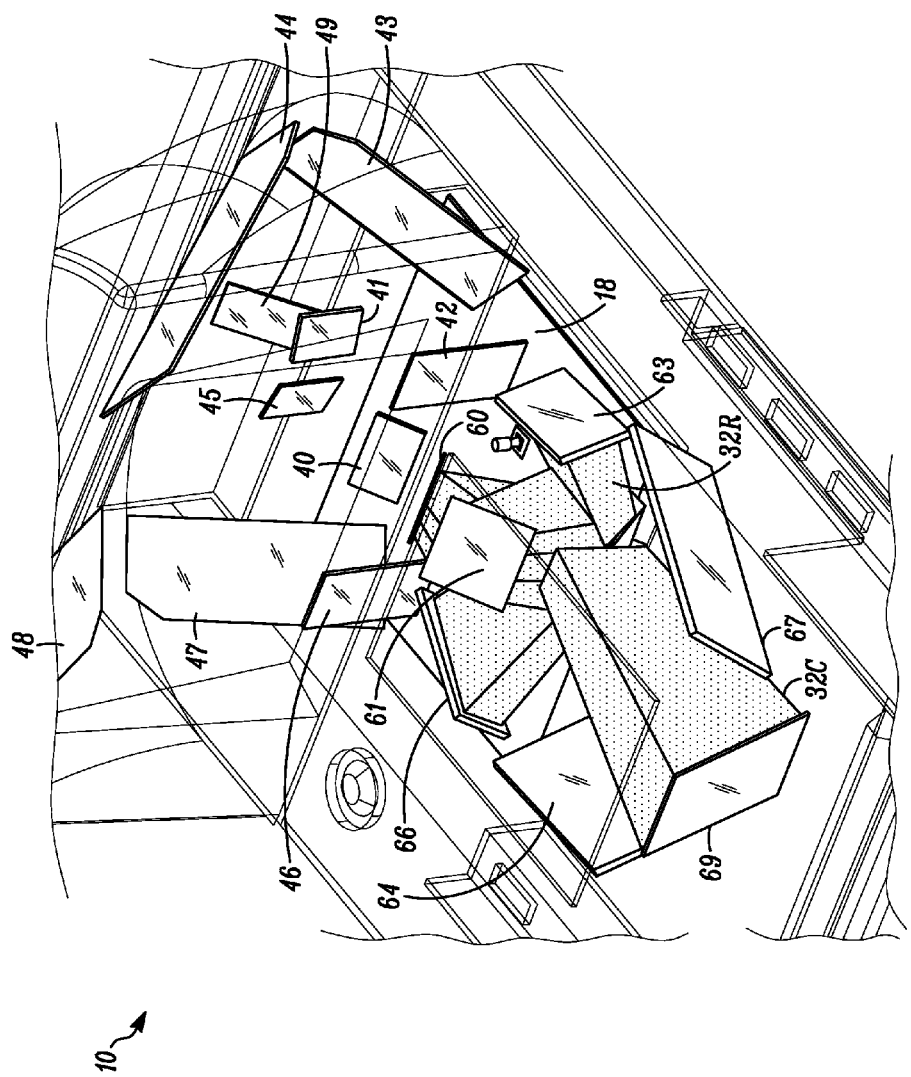
FIG. 10 is a perspective view diagrammatically depicting the subfields downstream of the optical splitter of FIG. 8.
Figure 11:
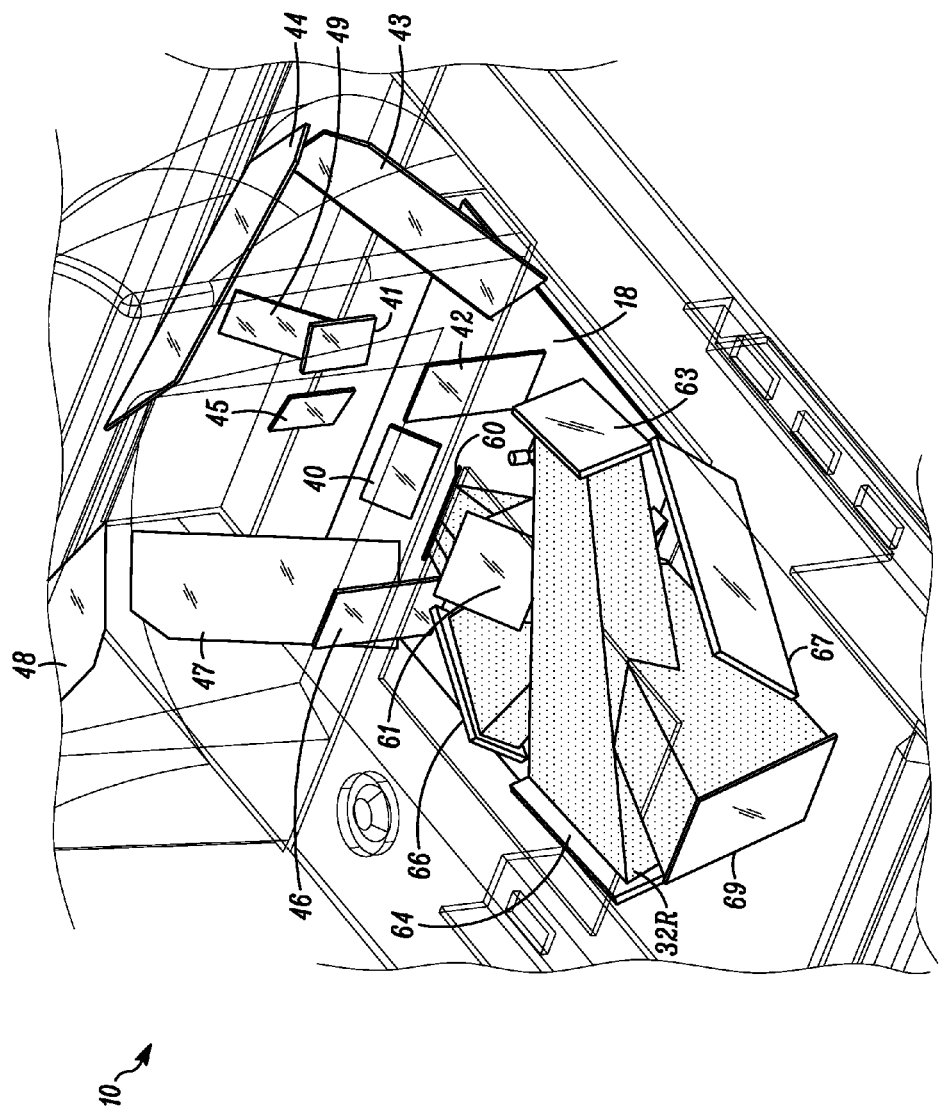
FIG. 11 is a perspective view diagrammatically depicting the subfields still further downstream of the optical splitter of FIG. 8.
Figure 12:
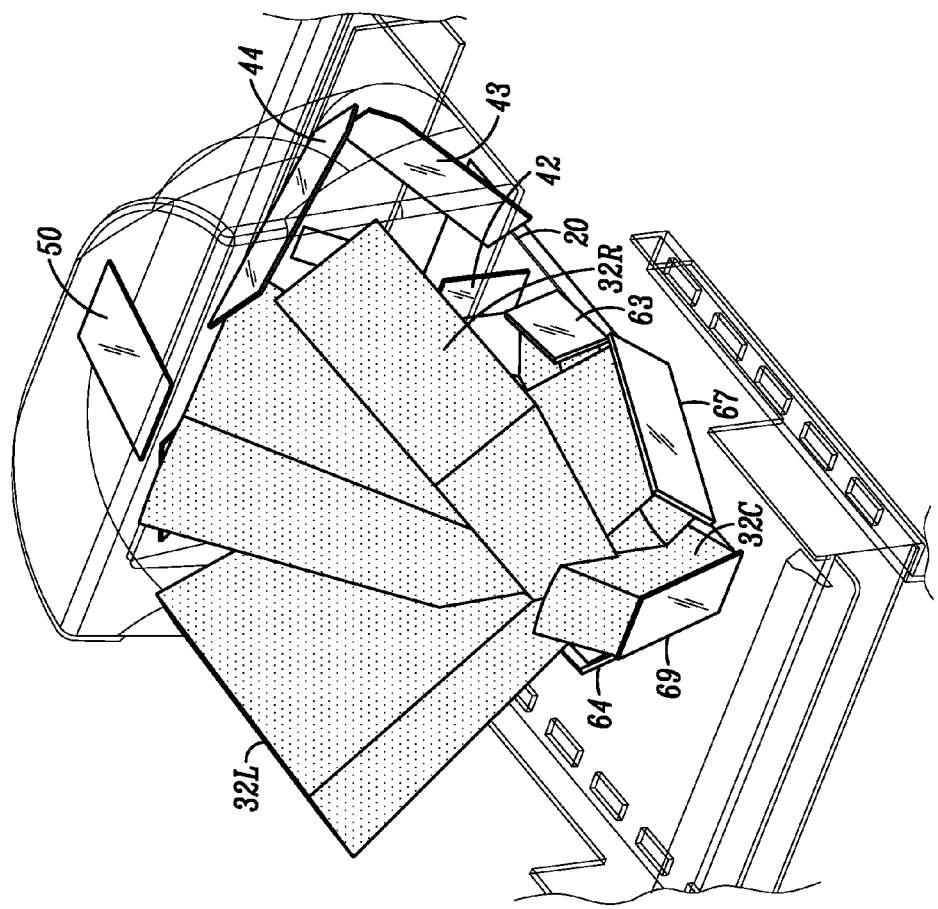
FIG. 12 is a perspective view of the other optical system part of FIG. 8 diagrammatically depicting three subfields exteriorly of the horizontal window of the workstation of FIG. 1.

FIG. 9 best depicts the folding of all three subfields between the mirrors 61 and 60 and the horizontal imager 32 away from the second optical splitter 62, 65 and 68. FIG. 10 best depicts the separate passage and folding of the outer subfield 32R between the mirrors 62 and 63, and also depicts the separate passage and folding of the outer subfield 32L between the minors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the minors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the minor 67, and the separate passage and folding of the central subfield 32C through the horizontal window 20 and onto the minor 69.

The use of the aforementioned two optical splitters reduces the number of imagers in the workstation 10. Thus, only two imagers 30, 32 are preferably needed to produce the six subfields 30C, 30L, 30R, 32C, 32L and 32R depicted in FIG. 13. These six subfields provide optimum visibility of indicia 14 on the various sides of the product 12 being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users.

As best seen in FIG. 14, energizable illuminators 70C1, 70C2 are mounted in spaced-apart relation rearwardly on board 18 for illuminating central subfield 30C; energizable illuminator 70R is mounted rearwardly on board 18 for illuminating outer subfield 30R; and energizable illuminator 70L is mounted rearwardly on board 18 for illuminating outer subfield 30L. Each illuminator is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). The imaging lens assembly 34 is operative for capturing the illumination light returned from the indicia in each subfield 30C, 30R and 30L along respective optical paths from the upright window 22 to the vertical imager 30. Non-illustrated illumination lenses overlie each illuminator to shape the outgoing illumination light and insure that the illumination light effectively fills the subfields 30C, 30R and 30L to minimize power consumption.

Figure 15:
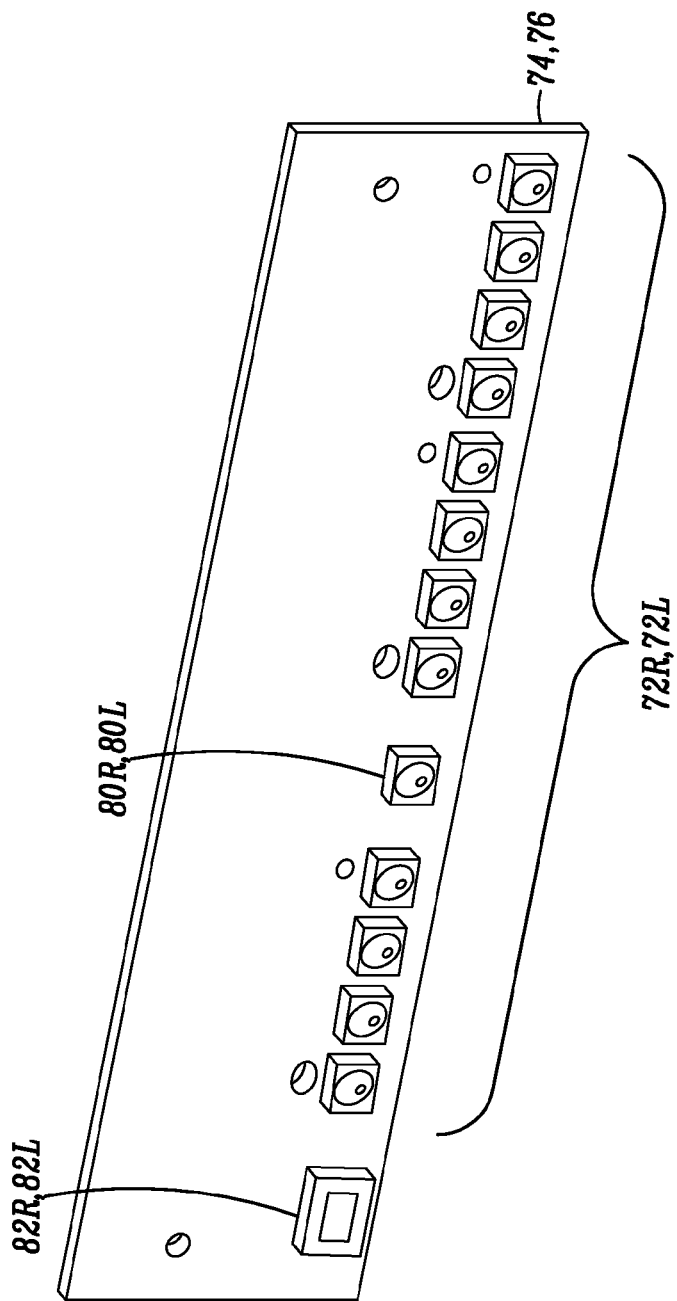
FIG. 15 is a perspective view of another proximity system commonly mounted with other system components on each of two auxiliary printed circuit boards within the workstation of FIG. 1 for detecting a product through the horizontal window of the workstation in accordance with this invention.
Figure 17:
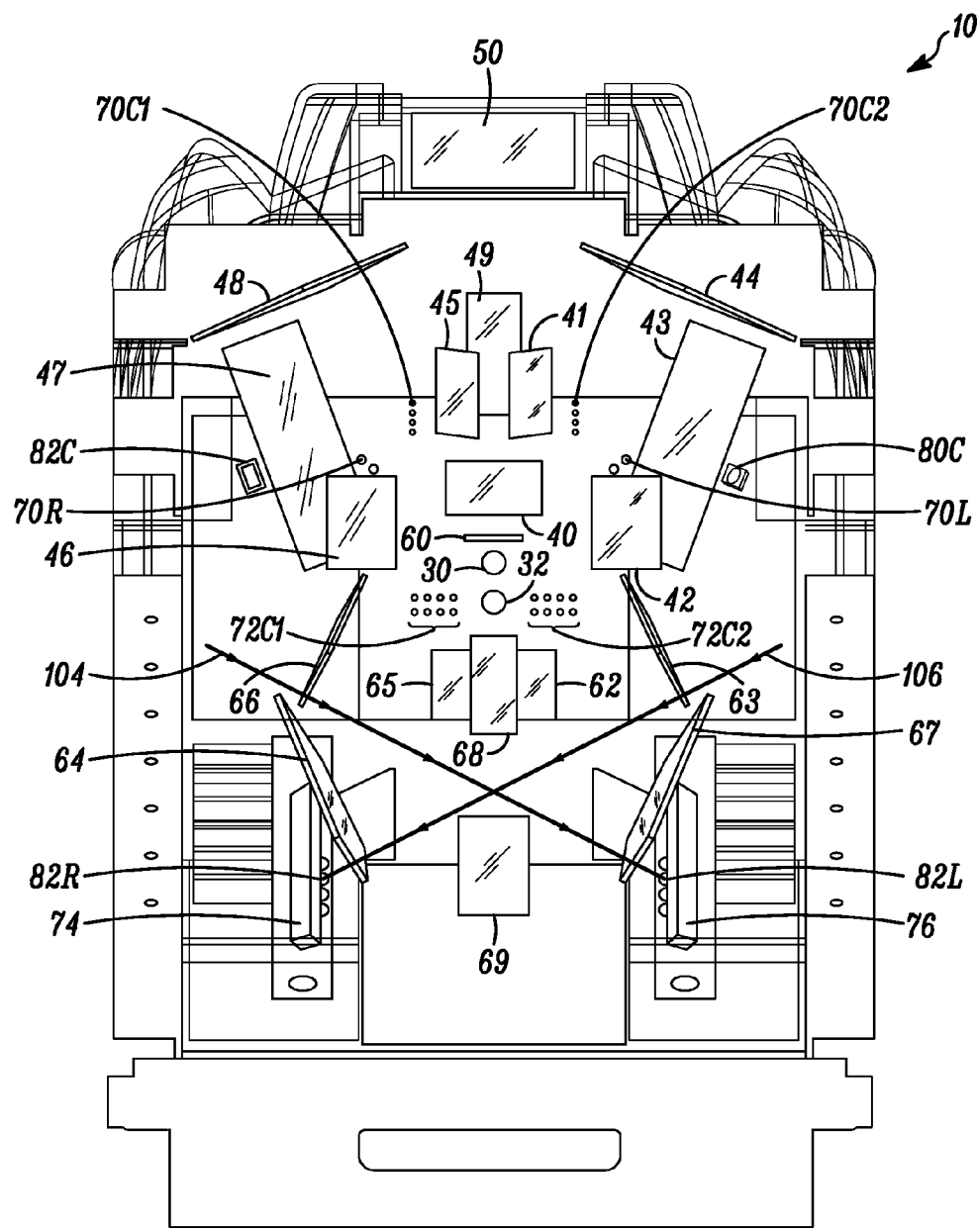
FIG. 17 is a top perspective view of the workstation of FIG. 1 depicting the proximity system of FIG. 15 and diagrammatically depicting the detection of a product through the horizontal window of the workstation in accordance with this invention.

Analogously, as also seen in FIG. 14, energizable illuminators 72C1, 72C2 are mounted in spaced-apart relation forwardly on board 18 for illuminating central subfield 32C. Energizable illuminator 72R is mounted on an auxiliary printed circuit board 74 (shown in isolation in FIG. 15) for illuminating outer subfield 32R; and energizable illuminator 72L is mounted rearwardly on another auxiliary board 76 (again, see FIG. 15) for illuminating outer subfield 32L. FIG. 17 is an overhead view that shows the placement of the auxiliary boards 74, 76. Analogously to that described above, each illuminator 72C1, 72C2, 72R and 72L is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). FIG. 15 shows such LEDs 72R or 72L on an enlarged scale. The imaging lens assembly 36 is operative for capturing the illumination light returned from the indicia in each subfield 32C, 32R and 32L along respective optical paths from the horizontal window 22 to the horizontal imager 32. Non-illustrated illumination lenses overlie each illuminator to shape the outgoing illumination light and insure that the illumination light effectively fills the subfields 32C, 32R and 32L to minimize power consumption.

Figure 16:
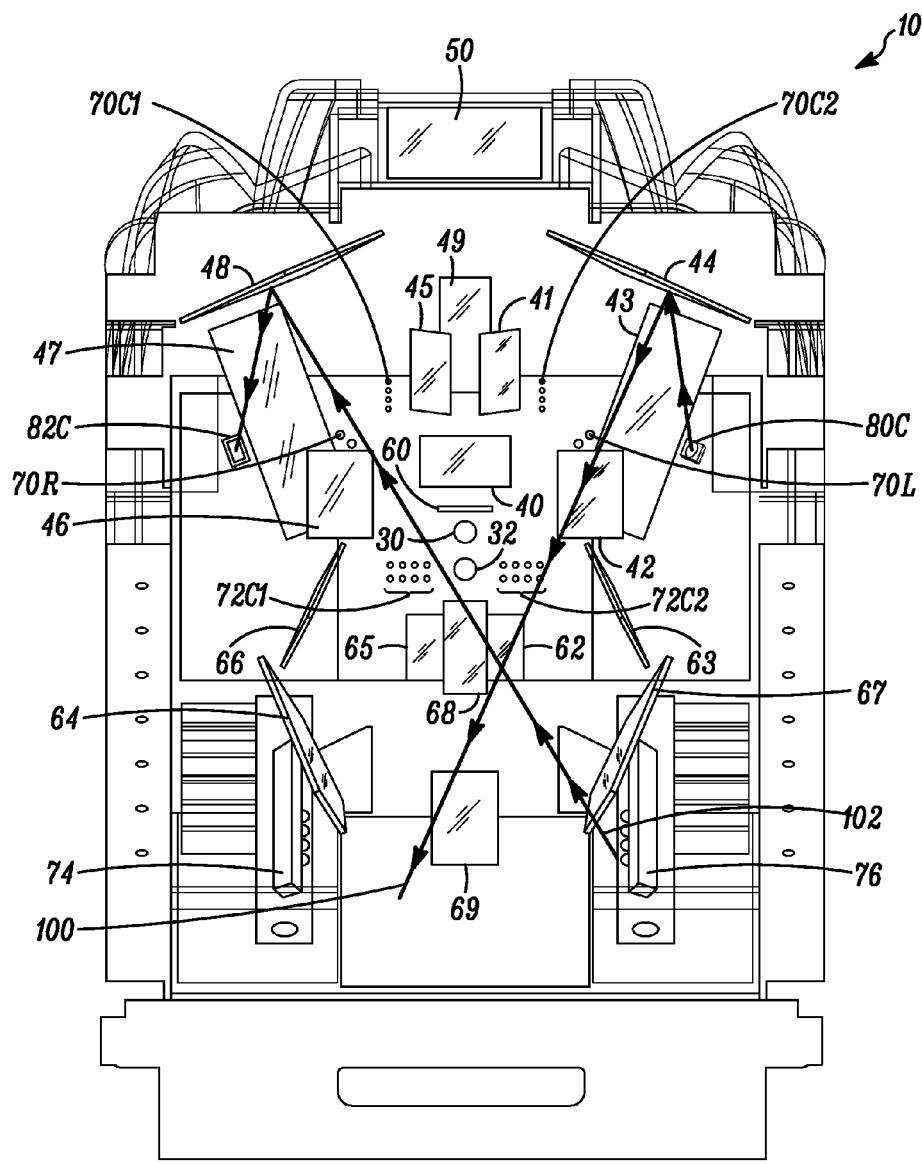
FIG. 16 is a top perspective view of the workstation of FIG. 1 depicting the proximity system of FIG. 14 and diagrammatically depicting the detection of a product through the upright window of the workstation in accordance with this invention.

As shown in FIG. 14, at least one proximity system, e.g., 80C, 82C is mounted on the main board 18, is located externally of the imager 30, and is operative for detecting the product 12 entering the field of view of the imager 30 to energize and activate the illuminators. This proximity system advantageously includes an infrared emitter 80C for emitting infrared light through the upright window 22 to the product 12 as depicted in FIG. 16 by chief outgoing ray 100, and an infrared sensor 82C for sensing return infrared light from the product 12 through the upright window 22 as depicted in FIG. 16 by chief incoming ray 102. In response to such detection of the product 12, the controller 24 is operative, in accordance with one feature of this invention, for adjusting the illumination time of the illuminators 70C1, 70C2, 70R, 70L and/or the exposure of the imager 30. The controller 24 is a programmed microprocessor that is also operative for processing the captured illumination light in at least one of the subfields of view to read the indicia, and to decode the indicia if the indicia is a symbol 14.

As shown in FIG. 15, additional proximity systems, e.g., 80R, 82R; and 80L, 82L, are respectively mounted on the auxiliary boards 74, 76, are located externally of the imager 32, and are operative for detecting the product 12 entering the field of view of the imager 32 from different directions to energize and activate the illuminators. Each of these additional proximity systems advantageously includes an infrared emitter 80R, 80L for emitting infrared light through right and left sides of the horizontal window 22 to the product 12, and an infrared sensor 82R, 82L for sensing return infrared light from the product 12 through the right and left sides of the horizontal window 22 as depicted in FIG. 17 by chief incoming rays 104, 106. In response to such detection of the product 12, the controller 24 is operative, in further accordance with this invention, for adjusting the illumination time of the illuminators 72C1, 72C2, 72R and 72L and/or the exposure of the imager 32.

Thus, the intensity level of the return infrared light in different directions is sensed by its own individually dedicated proximity system 80C, 82C; 80R, 82R; and 80L, 80L. The illumination time of each illuminator and/or the exposure of each imager are adjusted by the controller in response to the respective proximity system. The proximity system has heretofore only been used for product detection and for activating the illumination system. According to this invention, however, the proximity system is used for additional purposes, i.e., to adjust the illumination time and/or the imager exposure. No longer need such workstations rely on internal auto-exposure circuits that adjust the exposure of the imager after a few frames have elapsed. No longer need such workstations be characterized as sluggish or defective. Processing performance is enhanced, all without adding additional complexity and undue expense to the workstation.

It is further advantageous to store a plurality of predefined intensity level thresholds for the sensed return infrared light in the controller 24, and to have the controller 24 adjust the illumination time and/or the exposure by comparing the sensed return infrared light from the product 12 in real time operation with these predefined thresholds. Thus, the threshold for reading indicia 14 in a near range of working distances close to a respective window 20, 22 will be set to a shorter illumination time as compared to reading indicia 14 in a far range of working distances remote from the respective window 20, 22; otherwise, the sensed return illumination light will be too bright and will blind or saturate the respective imager 30, 32. An illumination time and/or exposure suitable for reading indicia 14 in a near range of working distances will not be suitable for reading indicia 14 in a far range of working distances, and vice versa. This invention therefore also proposes to store a predefined illumination time and/or exposure that are associated with, and assigned to, each stored predefined threshold in the controller 24. Upon determination of the level of the sensed return infrared light from the product 12 in real time operation, the assigned predefined stored illumination time and/or exposure are used, thereby increasing the responsiveness of the workstation and/or decreasing any performance dead areas in the scan zone arising from too much, or too little, intensity of the return illumination light.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. All six subfields are individually illuminated by their dedicated illuminators. Dedicated external proximity systems detect the entry of the product 12 from either the right side, left side, or central region of the workstation and responsively cause the controller 24 to adjust the illumination time of the illuminators and/or the exposure settings of the imagers.

It will be understood that each of the elements described above, or two or more together, also may find a useful application in other types of constructions differing from the types described above. Although infrared light is preferred for the proximity systems, other light-based proximity systems, as well as non-light-based proximity systems, can be employed.

While the invention has been illustrated and described as embodied in a point-of transaction workstation for electro-optically reading indicia by using two imagers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A point-of-transaction workstation operative to process products by electro-optically imaging indicia associated with the products, comprising:
 a housing;
 at least two substantially orthogonal windows supported by the housing;
 at least two solid state imagers supported by the housing and having an adjustable exposure, the at least one imager having an array of image sensors looking at a field of view that extends through the at least one window to the indicia to be imaged;
 at least one proximity system, said proximity system comprising an emitter and sensor located externally of the at least one imager, and operative to detect a product in the field of view;
 an illumination system supported by the housing and operative, in response to the detection of the product in the field of view, to illuminate the field of view with illumination light over an adjustable illumination time, the at least two solid-state imagers being operative to capture return illumination light from the indicia; and
 a controller operatively connected to the at least one imager, the illumination system, and the at least one proximity system, operative to adjust at least one of the illumination time of the illumination system and the exposure of the at least one imager in response to the detection of the product by the at least one proximity system and a comparison of illumination of the emitter received at the sensor from the indicia with stored threshold illumination data, and operative to process the captured illumination light in the field of view; and further comprising an optical system operative to split the field of view of at least one of the imagers into a plurality of subfields of view that simultaneously extend through the at least one window over regions of the product, and wherein the illumination system includes a plurality of illuminators, one for each subfield of view.

2. The workstation of claim 1, wherein the at least one window is located in a generally horizontal plane; and further comprising another window located in an upright plane that intersects the generally horizontal plane, and further comprising another solid-state imager supported by the housing and having another array of sensors looking at another field of view.

3. The workstation of claim 2; and further comprising an optical system including a first optical splitter for splitting the field of view of the at least one imager into a set of subfields of view that pass through the at least one window, and a second optical splitter for splitting the other field of view of the other imager into a set of subfields of view that pass through the other window.

4. The workstation of claim 1, wherein the at least one proximity system detects the product entering the field of view in one direction; and further comprising another proximity system located externally of the at least one imager, and operative for detecting the product entering the field of view in another direction that intersects the one direction.

5. The workstation of claim 4, wherein the at least one proximity system is mounted on a printed circuit board at one side of the housing, and wherein the other proximity system is mounted on another printed circuit board at an opposite side of the housing, and wherein both proximity systems emit and sense light through the at least one window.

6. The workstation of claim 5, and further comprising another window and another solid-state imager supported by the housing, the other imager having another array of sensors looking at another field of view; and further comprising a further proximity system mounted on a further printed circuit board and operative for detecting the product entering the other field of view through the other window.

7. The workstation of claim 6, wherein each proximity system includes an infrared emitter for emitting infrared light to the product, and an infrared sensor for sensing return infrared light from the product.

8. The workstation of claim 1, wherein the at least one proximity system includes an infrared emitter for emitting infrared light to the product, and an infrared sensor for sensing return infrared light from the product; and wherein the controller stores a plurality of predefined thresholds for the sensed return infrared light, stores at least one of a predefined illumination time and a predefined exposure assigned to each predefined threshold, and adjusts the at least one of the illumination time of the illumination system and the exposure of the at least one imager by comparing the sensed return infrared light from the product in real time operation with the stored predefined thresholds.

9. A point-of-transaction workstation operative to process by electro-optic ally imaging indicia associated with the products, comprising:
    a housing operative to support one window located in a generally horizontal plane, and another window located in an upright plane that intersects the generally horizontal plane, the windows bounding an area in which each product enters for processing;
    an imaging system supported by the housing and including a plurality of solid-state imagers, each having an adjustable exposure and an array of image sensors looking at a field of view that extends through a respective window to the indicia to be imaged;
    a plurality of proximity systems located externally of the imaging system, and operative for detecting a product in the respective field of view;
    an illumination system, wherein each proximity system includes an emitter and a sensor supported by the housing and including a plurality of illuminators, each of the illuminators being operative, in response to detection of the product in the field of view, to illuminate the respective field of view with illumination light over an adjustable illumination time, the imaging system being operative to capture return illumination light from the indicia; and
    a controller operatively connected to the imaging system, the illumination system, and the proximity systems operative to adjust at least one of the illumination time of a respective illumination system and the exposure of a respective imager in response to the detection of the product by a respective proximity system and a comparison of illumination of the emitter received at the sensor from the indicia with stored threshold illumination data, and operative to process the captured illumination light in the respective field of view; and further comprising an optical system operative to split the field of view of at least one of the imagers into a plurality of subfields of view that simultaneously extend through the at least one window over regions of the product, and wherein the illumination system includes a plurality of illuminators, one for each subfield of view.

10. The workstation of claim 9, wherein each proximity system includes an infrared emitter for emitting infrared light to the product, and an infrared sensor for sensing return infrared light from the product.

11. A method of processing products by electro-optically imaging indicia associated with the products, the method comprising the steps of:
    supporting at least two substantially orthogonal windows each having one solid-state imager having an adjustable exposure and an array of image sensors looking at each field of view of the imagers that extends through each of the corresponding at least two windows to the indicia to be imaged on a housing;
    detecting a product in the field of view with at least one proximity system located externally of the at least one imager, wherein the at least one proximity system includes an emitter and a sensor;
    illuminating the field of view with illumination light from an illumination system over an adjustable illumination time in response to detection of the product in the field of view of the imagers;
    capturing return illumination light from the indicia;
    adjusting at least one of the illumination time of the illumination system and the exposure of the at least one imager in response to the detection of the product by the at least one proximity system and a comparison of illumination of the emitter received at the sensor from the indicia with stored threshold illumination data; and
    processing the captured illumination light in the field of view; and further comprising splitting the field of view of at least one of the imagers into a plurality of subfields of view that simultaneously extend through the at least one window over regions of the product, and wherein the illuminating step is performed by plural illuminators, one for each subfield of view.

12. The method of claim 11, and the step of locating the at least one window in a generally horizontal plane; and further comprising the step of locating another window in an upright plane that intersects the generally horizontal plane, and further comprising the step of supporting another solid-state imager having another array of sensors looking at another field of view on the housing.

13. The method of claim 12; and further comprising the steps of splitting the field of view of the at least one imager into a set of subfields of view that pass through the at least one window, and splitting the other field of view of the other imager into a set of subfields of view that pass through the other window.

14. The method of claim 11, wherein the detecting step is performed by the at least one proximity system detecting the product entering the field of view in one direction, by locating another proximity system externally of the at least one imager, and by the other proximity system detecting the product entering the field of view in another direction that intersects the one direction.

15. The method of claim 14, and the steps of mounting the at least one proximity system on a printed circuit board at one side of the housing, and mounting the other proximity system on another printed circuit board at an opposite side of the housing, and wherein both proximity systems emit and sense light through the at least one window.

16. The method of claim 15, and further comprising the step of supporting another window and another solid-state imager on the housing, the other imager having another array of sensors looking at another field of view; and further comprising the step of mounting a further proximity system on a further printed circuit board for detecting the product entering the other field of view through the other window.

17. The method of claim 16, and the step of configuring each proximity system to include an infrared emitter for emitting infrared light to the product, and an infrared sensor for sensing return infrared light from the product.

18. The method of claim 11, and the step of configuring the at least one proximity system to include an infrared emitter for emitting infrared light to the product, and an infrared sensor for sensing return infrared light from the product; and the steps of storing a plurality of predefined thresholds for the sensed return infrared light, storing at least one of a predefined illumination time and a predefined exposure assigned to each predefined threshold, and adjusting the at least one of the illumination time of the illumination system and the exposure of the at least one imager by comparing the sensed return infrared light from the product in real time operation with the stored predefined thresholds.

* * * * *

UNITED STATES PATENT AND TRADEMARK OFFICE
CERTIFICATE OF CORRECTION

PATENT NO.         : 8,387,878 B2
APPLICATION NO.    : 13/190876
DATED              : March 5, 2013
INVENTOR(S)        : Chen et al.

Page 1 of 1

It is certified that error appears in the above-identified patent and that said Letters Patent is hereby corrected as shown below:

On the Title Page, Item (75), under "Inventors", in Column 1, Line 4, delete "L" and insert -- L. --, therefor.

In the Specification

In Column 7, Line 62, delete "minors" and insert -- mirrors --, therefor at each occurrence throughout the specification.

In Column 8, Line 18, delete "minor" and insert -- mirror --, therefor at each occurrence throughout the specification.

In the Claims

In Column 13, Line 23, in Claim 9, delete "electro-optic ally" and insert -- electro-optically --, therefor.

Signed and Sealed this
Fourth Day of November, 2014

Michelle K. Lee
*Deputy Director of the United States Patent and Trademark Office*